(12) United States Patent
Camacho et al.

(10) Patent No.: US 7,051,413 B2
(45) Date of Patent: May 30, 2006

(54) PROCESS FOR REPLACING A MOTOR-VEHICLE CONVERTIBLE TOP

(75) Inventors: Rosendo Camacho, Panorama City, CA (US); Mark Randolph Robbins, Camarillo, CA (US)

(73) Assignee: Robbins Auto Top Company, Oxnard, CA (US)

( * ) Notice: Subject to any disclaimer, the term of this patent is extended or adjusted under 35 U.S.C. 154(b) by 183 days.

(21) Appl. No.: 10/803,773

(22) Filed: Mar. 17, 2004

(65) Prior Publication Data
US 2005/0204531 A1 Sep. 22, 2005

(51) Int. Cl.
*B23P 6/00* (2006.01)

(52) U.S. Cl. .................. 29/402.08; 29/402.01

(58) Field of Classification Search .......... 29/402.08, 29/402.03, 402.01, 402.06, 402.09, 402.11, 29/402.12, 402.14, 426.1, 426.4, 428, 505, 29/525, 525.01; 296/107.06, 146.14, 146.8
See application file for complete search history.

(56) References Cited

U.S. PATENT DOCUMENTS

| 4,566,728 A | * | 1/1986 | Theodore ..................... 296/76 |
| 6,082,807 A | | 7/2000 | Hartmann et al. |
| 6,152,518 A | * | 11/2000 | Schonenbach ......... 296/107.06 |
| 6,309,009 B1 | | 10/2001 | Blochl et al. |
| 6,340,196 B1 | | 1/2002 | Windpassinger et al. |
| 6,471,283 B1 | * | 10/2002 | Windpassinger et al. ..................... 296/146.14 |

* cited by examiner

*Primary Examiner*—John C. Hong
(74) *Attorney, Agent, or Firm*—Kelly Lowry & Kelley, LLP

(57) ABSTRACT

A process for replacing a first soft-top of a convertible-top of a motor vehicle with a second soft-top includes removing the first soft-top from the convertible-top. The first soft-top is separated from a headliner of the convertible-top. The second soft-top is selected. The second soft-top has a window larger than a window of the first soft-top. A plurality of receptacles are fixed to an edge of the larger window. The second soft-top is attached to the motor vehicle. The larger window is connected directly to the headliner by engaging headliner anchors with the receptacles fixed to the larger window.

21 Claims, 5 Drawing Sheets

PROCESS FOR REPLACING A MOTOR-VEHICLE CONVERTIBLE TOP

BACKGROUND OF THE INVENTION

The invention relates generally to a motor vehicle convertible top. More particularly, the invention relates to a process for replacing a damaged convertible top with a replacement top.

A conventional convertible roof of a motor vehicle has a relatively stiff but foldable outer covering, a metal frame, padding, and a relatively soft inner cloth headliner. The metal frame is an expandable and collapsible mechanism that allows the movement of the convertible roof between raised and lowered configurations. The conventional convertible roof (also referred to as a convertible top, soft-top or 'rag top') includes at least one window, usually the rear window. The padding is used for sound dampening and is bonded to the headliner, attached to the metal frame, or otherwise secured in the convertible roof. The window is held within a pocket of the soft-top and/or adhered thereto. The soft top attaches to a top portion of the metal frame and the interior headliner attaches to a lower portion of the metal frame; sandwiching the metal frame and padding therebetween.

There is a great need for replacing motor vehicle convertible tops. Over the years, many types of processes have been used to attach convertible tops to a motor vehicle. However, replacing damaged or worn out O.E.M. convertible tops with after-market tops can be complicated. Damage to the soft top can come from damage to the material of the soft top and/or damage to the window attached to and/or otherwise held within the soft top.

Headliners in convertible tops are very expensive and can cost as much as the exterior cloth convertible top. Unless a means is found to be able to attach the original headliner to an aftermarket top, the cost to purchase a separate top and headliner is prohibitively high, and owners will opt to purchase replacement tops only from O.E.M. dealers. This effectively eliminates aftermarket manufacturers from producing replacement tops for convertibles; a goal long cherished by convertible manufacturers.

Several O.E.M. tops employ molding to connect a soft-top to the headliner. However, this use of molding makes it difficult for the top alone to be replaced without also having to replace the headliner. For example, U.S. Pat. No. 6,152,518 discloses a roof-lining system for a motor vehicle convertible roof. However, this system uses a combination of molding and an extrusion to hold a window in position. In another example, U.S. Pat. No. 6,471,283 discloses a window mount for a motor-vehicle soft top. However, this system also uses a special molded extrusion that bonds the glass window into the fabric topping of the convertible top that is wider than the glass it encloses; the molding connecting to the headliner.

While processes, such as the one described above, may provide a means to connect a convertible top to a motor vehicle, such processes can always be improved.

Accordingly, there is a need for a replacement convertible soft top that can be used with the O.E.M. headliner. There is a further need for a process for connecting a replacement window to an O.E.M headliner. There is also a need for a convertible top where no molding process is utilized to secure the soft-top and/or window to the motor vehicle. The present invention satisfies these needs and provides other related advantages.

SUMMARY OF THE INVENTION

The present invention provides a replacement convertible soft top that can be used with the O.E.M. headliner. The present invention further provides a process for connecting a replacement window to an O.E.M headliner. The present invention additionally provides a convertible top where no molding process is utilized to secure the soft-top and/or window to the motor vehicle.

A process for replacing a first soft-top of a convertible-top of a motor vehicle with a second soft-top is disclosed that includes removing the first soft-top from the convertible-top. The first soft-top is separated from a headliner of the convertible-top. The second soft-top is selected. The second soft-top has a window larger than a window of the first soft-top. A plurality of receptacles are fixed to an edge of the larger window. The second soft-top is attached to the motor vehicle. The larger window is connected directly to the headliner by engaging headliner anchors with the receptacles fixed to the larger window.

The plurality of receptacles are aligned with the headliner anchors when fixed to the edge of the larger window. Additionally, a pocket of each receptacle is aligned with a respective one of the anchors.

The receptacles can be integrally formed with the larger window. The receptacles can also be adhered to the larger window.

Selection of the second soft-top also includes selecting the larger window and securing the larger window to the second soft-top.

When engaging the headliner anchors with the receptacles fixed to the larger window, the receptacles and anchors are mechanically connected utilizing a plurality of fasteners. Each fastener comprises a flexible clip for gripping and elastically retaining the anchor within a pocket of the respective receptacle. Each anchor includes a base connected to the headliner and an inverted U-shaped bar connected to the base. The flexible clip hooks a respective anchor and free ends of the clip are frictionally retained within the pocket of the receptacle.

Alternatively, a fastener could be a threaded shaft for matingly engaging a threaded pocket of the respective receptacle.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
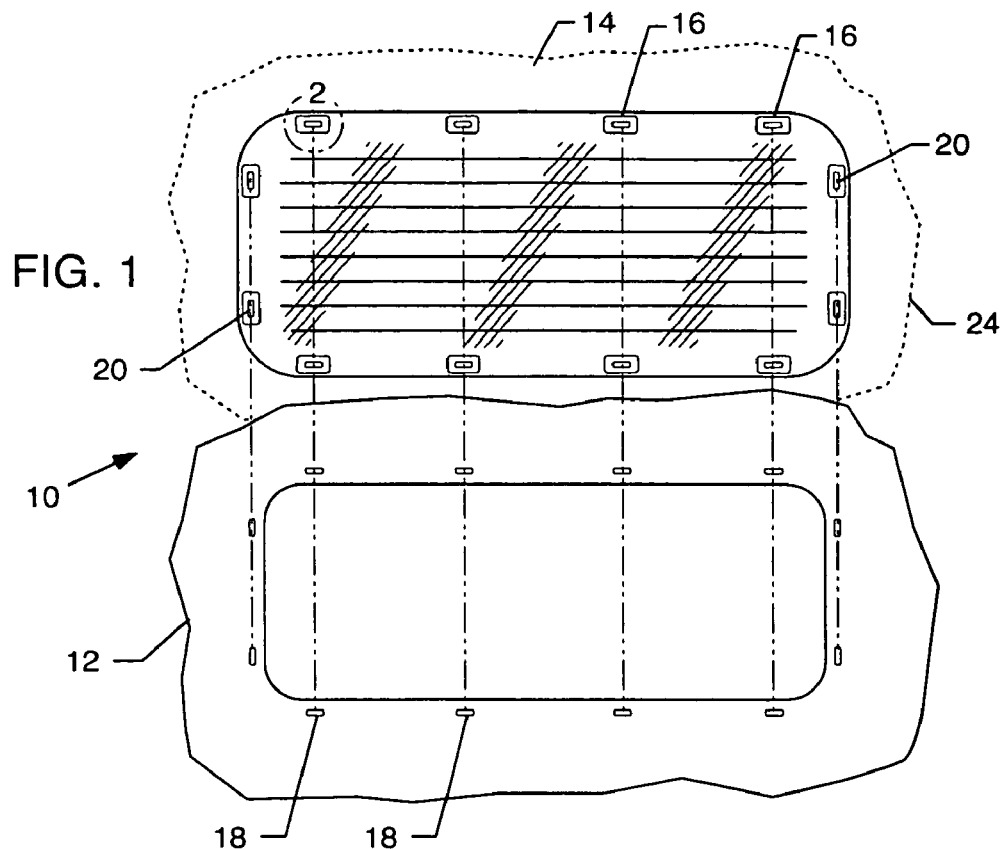
FIG. 1 is a top plan exploded view of a roof liner attachment for a motor vehicle convertible top embodying the present invention.
Figure 2:
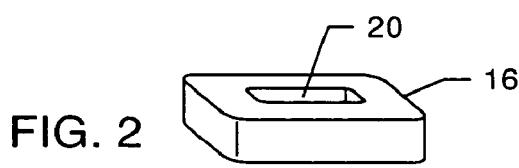
FIG. 2 is an orthogonal view of a bracket embodying the present invention.
Figure 3:
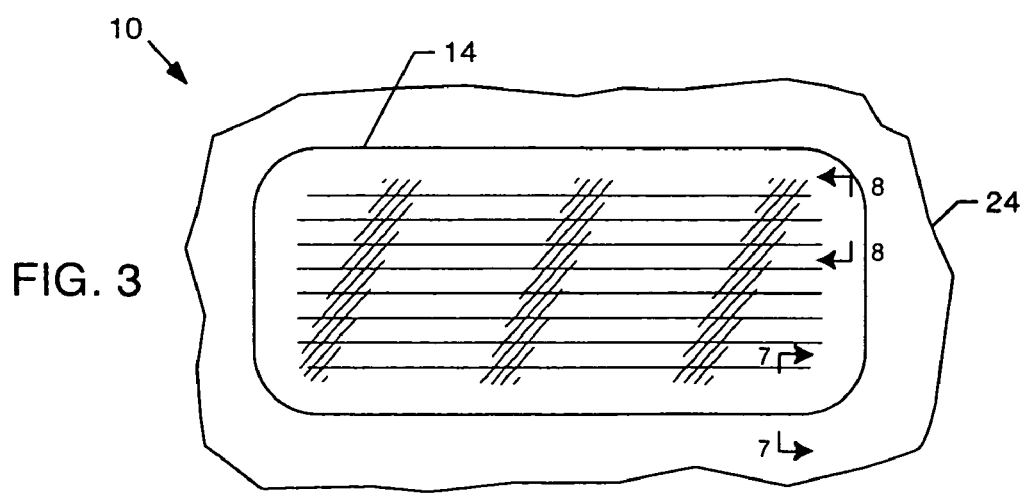
FIG. 3 is a top plan view of a roof liner attachment for a motor vehicle convertible top embodying the present invention.
Figure 4:
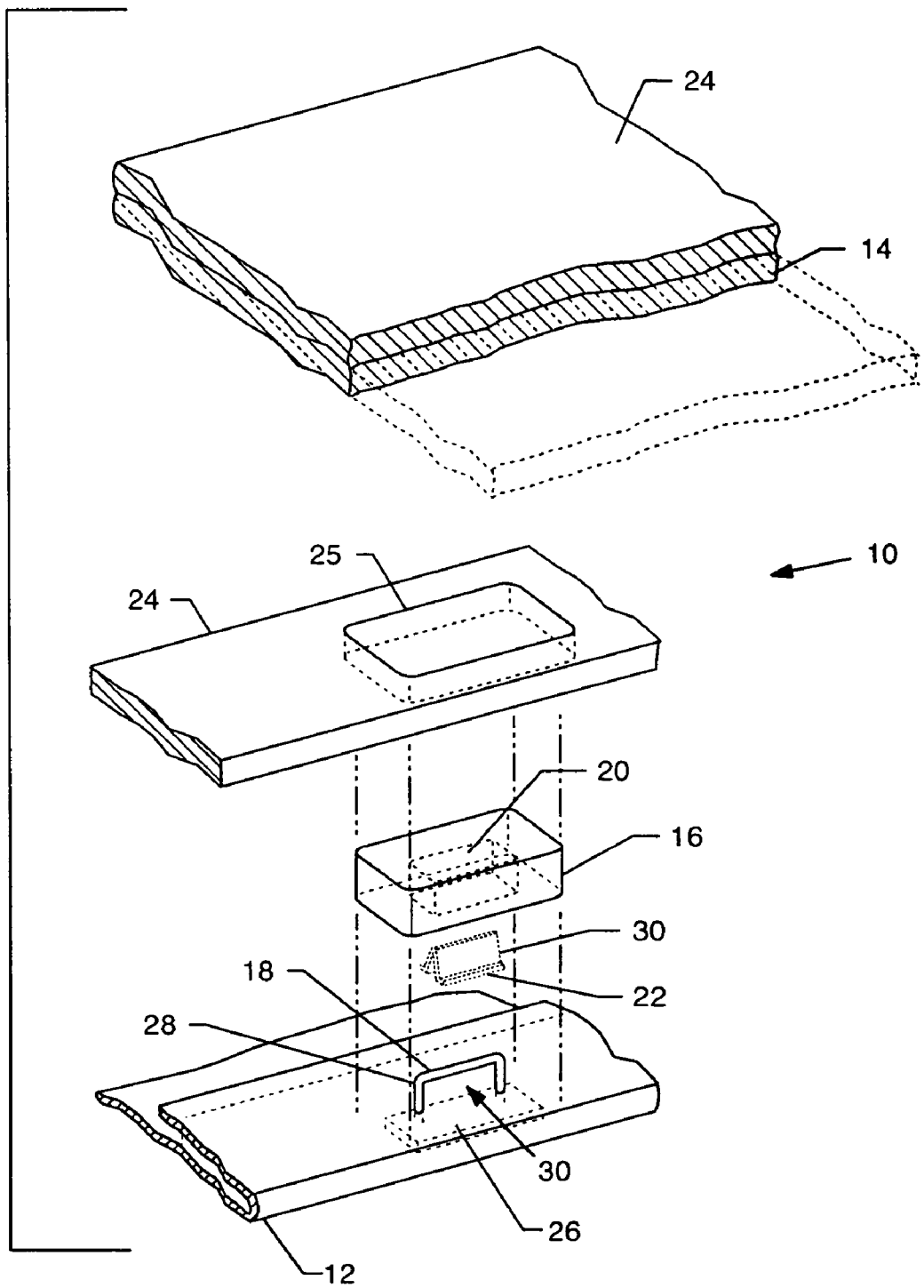
FIG. 4 is an orthogonal exploded view of a roof liner attachment embodying the present invention.
Figure 5:
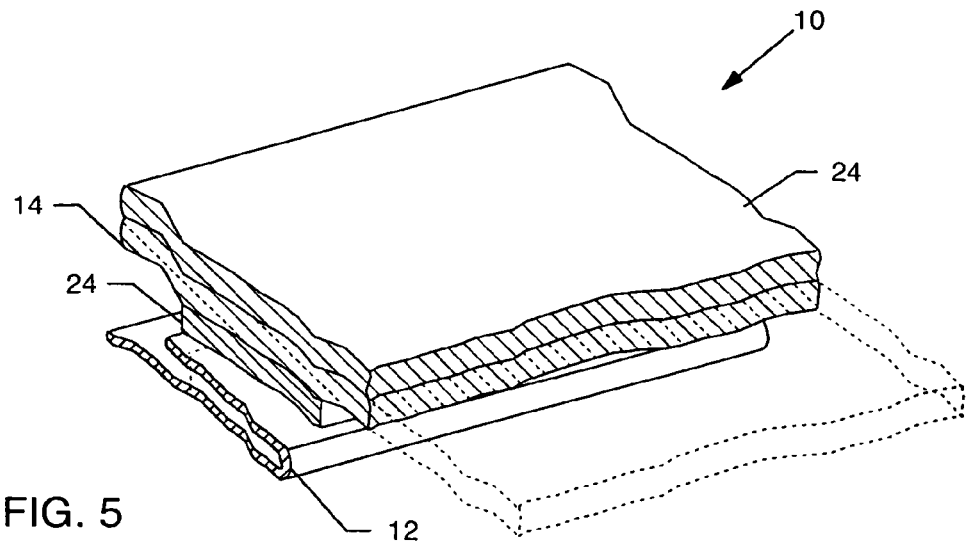
FIG. 5 is an orthogonal view of a roof liner attachment embodying the present invention.
Figure 6:
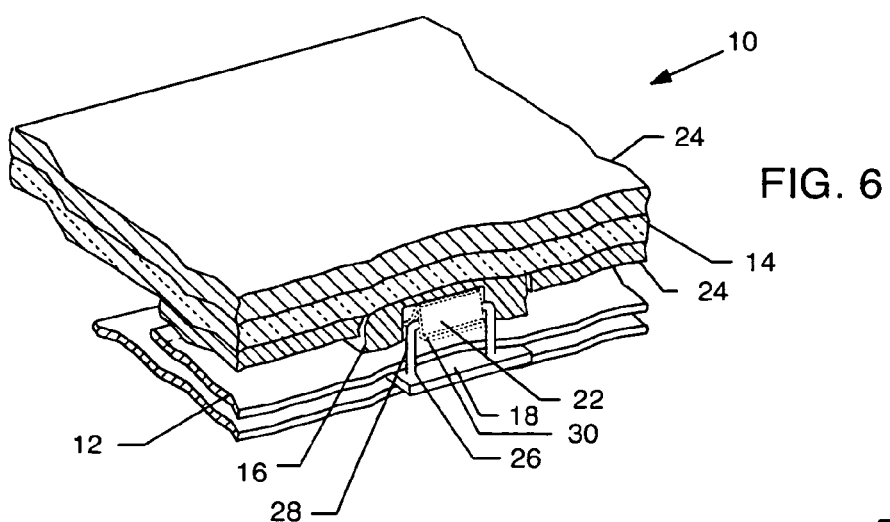
FIG. 6 is an orthogonal cross-sectional view of a roof liner attachment embodying the present invention.
Figure 7:
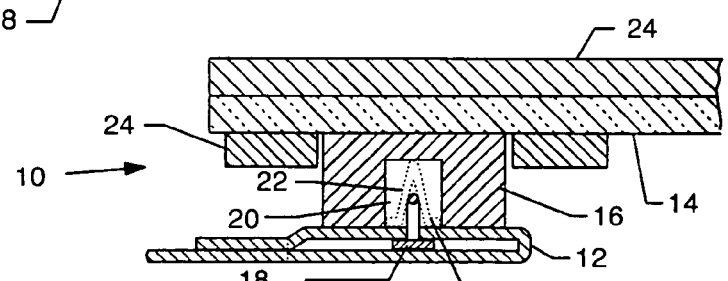
FIG. 7 is a side elevational cross-sectional view of a roof liner attachment embodying the present invention.
Figure 8:
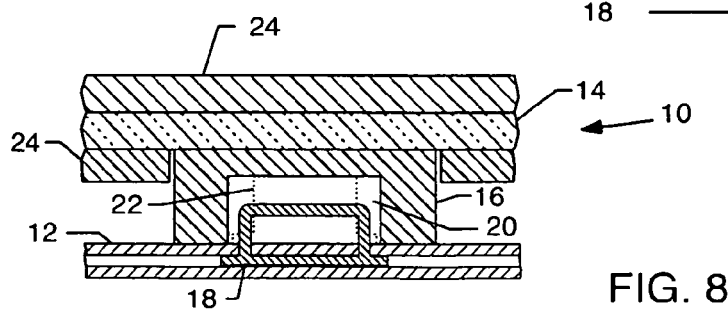
FIG. 8 is a front elevational cross-sectional view of a roof liner attachment embodying the present invention.

The present invention provides a system and process for replacing the soft-top of a motor vehicle convertible top. The present invention provides a convertible soft top that can replace an O.E.M. soft-top. The present invention further provides a replacement convertible soft top that can be used with an O.E.M. headliner of the motor vehicle. The present invention also provides a system of connecting a replacement window to an O.E.M headliner. The present invention additionally provides a convertible top where no molding process is utilized to secure the soft top and/or window to the motor vehicle.

As shown in the drawings for purposes of illustration, an embodiment of the present invention resides in a roof liner attachment system 10 for a convertible-type motor vehicle having an O.E.M. headliner 12. As illustrated in FIGS. 1–10, the system 10 includes a window 14 and a plurality of brackets or receptacles 16 operationally connected to and positioned along at least one peripheral edge of the window 14. A plurality of attachments 18, in the form of fittings, anchors or the like, extend from the O.E.M. headliner 12.

Each receptacle 16 includes a pocket 20 aligned with a particular one of the attachments 18. The receptacles 16 may be made out of a variety of materials including, but not limited to, hard plastic, metal, wood or the like. The receptacle 16 may be colored to match the interior and/or exterior color scheme of the motor vehicle.

The number of receptacles 16 varies, depending on the type of motor vehicle and the original number of attachments 18 provided in the O.E.M. headliner 12 by the motor vehicle manufacturer. For example, twelve receptacles 16 are shown in the figures to attach the window 14 to the O.E.M. headliner. These receptacles 16 are positioned around the inside perimeter of the glass window 14 in the same locations as the attachments 18 so that the receptacles 16 and attachments 18 are aligned. The positioning of the receptacles 16 on any particular location on the window 14 (e.g., top, bottom, side, etc.) depends on the make and model of the motor vehicle involved. For example, one particular make and model motor vehicle may be designed such that the receptacles 16 are positioned only on the top and sides of the glass window 14, but not on the bottom, in order to mirror where the automobile manufacturer positioned the attachments 18. Other make and model convertible tops may require that the receptacles 16 be positioned along the bottom, top, and/or around all edges of the glass window 14, depending on how a particular convertible top raises and lowers its headliner.

A plurality of fasteners 22 mechanically connect the receptacles 16 to the attachments 18. The fasteners 22 include flexible clips holding the attachments 18 within the pockets 20 of the receptacles 16. The flexible clips 22 grip and elastically retain the attachments 18 within the pockets 20. The flexible clips 22 come in several shapes including, but not limited to, V-shaped, U-shaped or the like.

The window 14 is made of automotive safety glass sized and shaped so as to cover the attachments 18 provided in the existing O.E.M. headliner. The may result in the replacement glass window 14 being dimensionally larger than the window being replaced. The window 14 is secured to a removable replacement soft-top 24 prior to the window 14 being connected to the O.E.M. headliner 12. The glass window 14 is secured to the soft-top 24 utilizing a thermally activated adhesive.

Alternatively, other types of adhesives or sealants, as well as mechanical devices utilizing metal components, rubber seals, plastics or other materials may be used to secure the glass window 14 to the soft-top 24. For example, RTV silicone may be used to install the window 14 into the soft-top 24. In another example, the glass window 14 may be bonded to a metal frame (not shown), using adhesives similar to those used to install windshields, which is then connected to the soft-top 24. In yet another example, a metal frame the same shape as the glass window 14 may be used to secure both the window 14 and the headliner 12 to the soft-top 24.

The window 14 may also be secured to the soft-top 24 after the window 14 is connected to the O.E.M. headliner 12. The replacement soft-top 24 may be made out of a variety of materials including, but not limited to, vinyl, cloth, vinyl exterior bonded to a cotton interior, a woven acrylic bonded to cotton, polyester, a polyester/cotton blend, or the like. No molding process is required to secure the window 14 to the soft-top 24.

The receptacles 16 will be adhered to the soft-top 24 (i.e., the receptacles will be adhered to the window 14 held by the soft-top 24) at locations to align the receptacles 16 with the attachments 18. A space 25 is cut into the soft-top 24 surrounding the window 14 to allow the receptacles 16 to be attached to the window 14. Alternatively, the receptacles 16 may be of single piece construction or formed integrally with the window 14. The receptacles 16 may come in a variety of shapes including, but not limited to, rectangular, circular, cubed, hemispherical or the like.

The receptacles 16 can also be attached to the window by means other than adhesives. For example, if a receptacle 16 is made of metal, the receptacle 16 could be welded or held in place with clips, screws or bolts.

Each attachment 18 includes a base 26 connected to the headliner 12 and an inverted U-shaped bar 28 connected to the base 26. A fastener 22 (e.g. a flexible clip) operationally connects to a particular attachment 18 when the flexible legs or free ends 30 of the fastener 22 grip the U-shaped bar 28; wherein free ends of the clip 22 are approximately flush with the pocket 20 of the receptacle 16 and are held in place by a friction-fit with the pocket 20.

When the window 14 is connected to the headliner 12, a portion of the inverted U-shaped bar 28 extends into the pocket 20 and is held in place by the clip 22.

Figure 9:
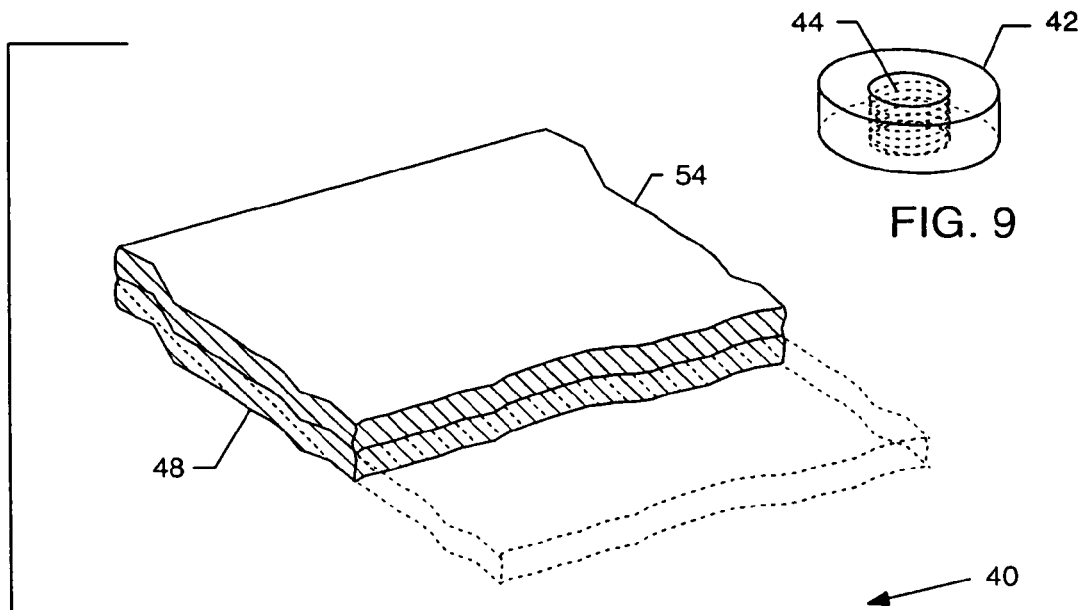
FIG. 9 is an orthogonal view of another bracket embodying the present invention.
Figure 10:
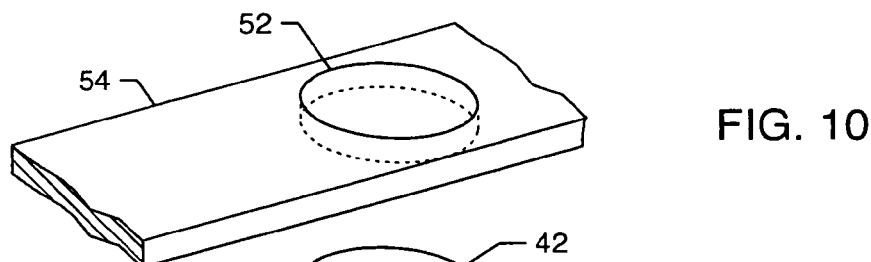
FIG. 10 is an orthogonal exploded view of a roof liner attachment with the bracket of FIG. 9 embodying the present invention.
Figure 11:
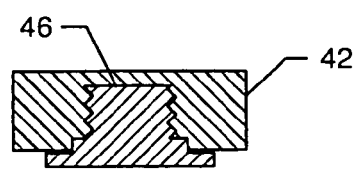
FIG. 11 is a cross-sectional view of the bracket and fastener of FIG. 10.

In the alternative, as seen in FIGS. 9–11, the system 40 includes receptacles 42 with pockets 44 that are threaded. The attachments 46 include fasteners in the form of threaded shafts matingly engaging the pockets 44. The plurality of receptacles 42 are operationally connected to and positioned along at least one peripheral edge of a window 48 and the plurality of attachments 46 extend from the O.E.M. headliner 50 holding the attachments 46. A space 52 is cut into a soft-top 54 surrounding the window 48 to allow the receptacles 42 to be attached to the window 48.

Figure 12:
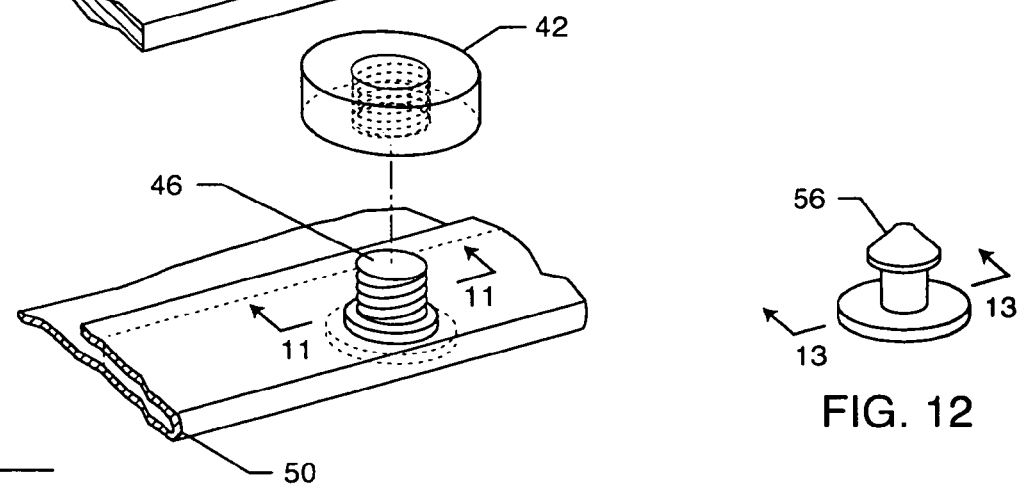
FIG. 12 is an orthogonal view of a fastener for attachment to a bracket embodying the present invention.
Figure 13:
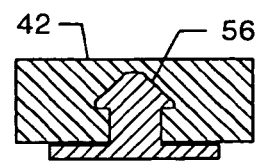
FIG. 13 is a cross-sectional view of the bracket of FIG. 9 modified to mate with the fastener of FIG. 12.

FIGS. 12 and 13, illustrate an alternative fastener 56 for use with the receptacle 42 of FIG. 9. This fastener 56 would snap-into position within the receptacle 42 operationally connected to an automotive window in the manner described above. Another alternative fastener (not shown) might have a ball and joint connection with a receptacle.

Figure 14:
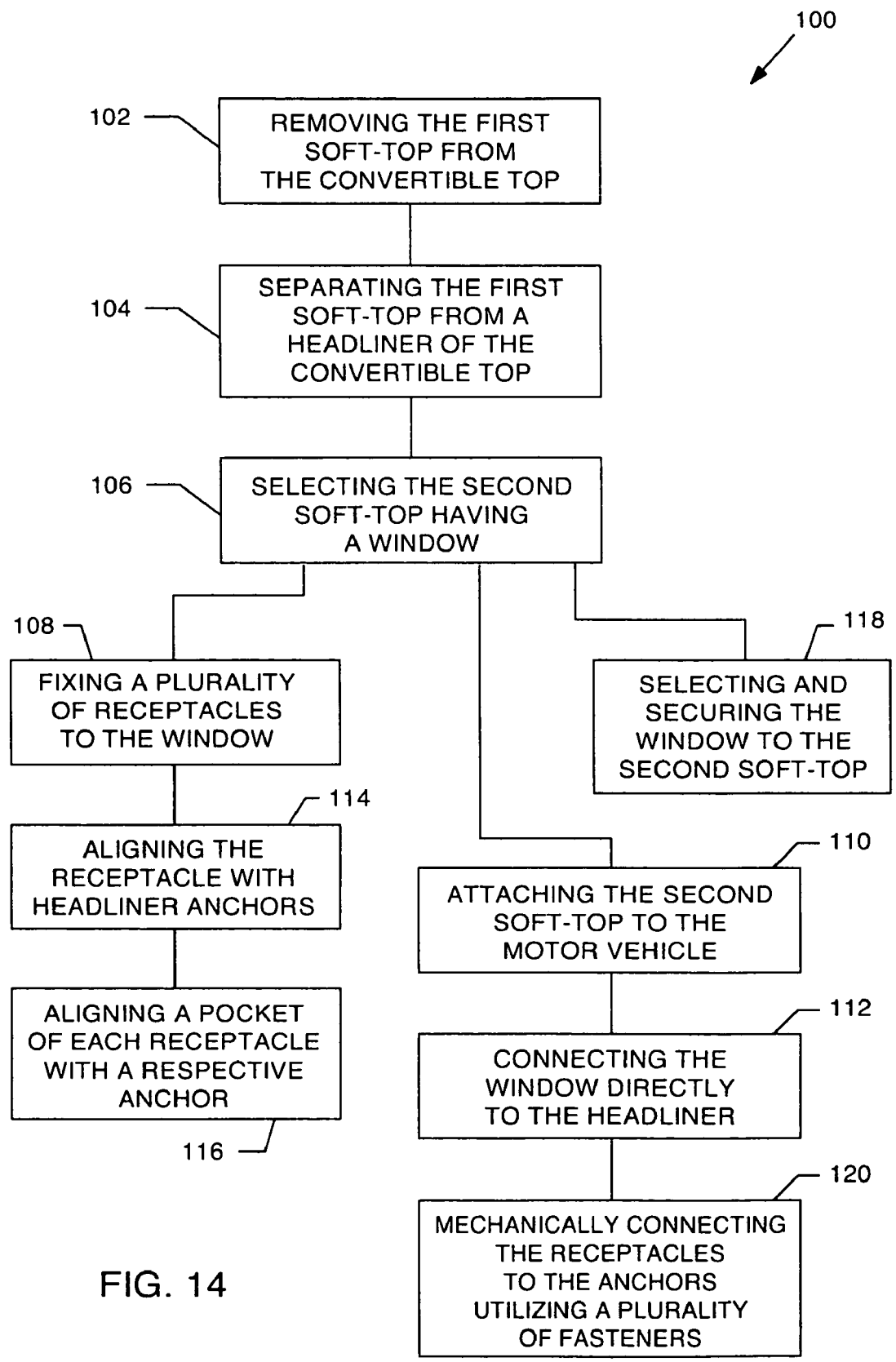
FIG. 14 is a flow chart of a process embodying the present invention.

In use, as seen in FIG. 14, a process 100 for replacing a first soft-top of a convertible-top of a motor vehicle with a second soft-top includes removing 102 the first soft-top from the convertible-top. The first soft-top is also separated 104 from a headliner of the convertible-top. The first soft-top is removed from the metal frame which the headliner is also connected to. The second soft-top is selected 106. The second soft-top has a window larger than a window of the first soft-top. A plurality of receptacles are fixed 108 to an edge of the larger window and the second soft-top is attached 110 to the motor vehicle. The larger window is connected 112 directly to the headliner by engaging headliner anchors with the receptacles fixed to the larger window.

When the receptacles are fixed 108 to the window, the receptacles are also aligned 114 with the headliner anchors.

When the receptacles are aligned 114 with the anchors, a pocket of each receptacle is also aligned 116 with a respective one of the anchors.

When the second soft-top is selected 106, the larger window is also selected and secured 118 to the second soft-top.

When the larger window is connected 112 directly to the headliner, the receptacles are mechanically connected 120 to the anchors utilizing a plurality of fasteners.

In the alternative, the systems described above could be used in a variety of applications other than for attaching a convertible soft-top rear window to an O.E.M. headliner. For example, one possible application would be to install sunshades on motor vehicle rear windows to protect the interior upholstery from exposure to UV light. Receptacles could be bonded to metal or plastic for a variety of industrial and household uses to attach coverings, displays, panels, shelving or other structures that could be installed and removed quickly. The system would involve any object (e.g., a panel, a cover, a display, a shelf, a window, a sunshade or the like) that a user desires to connect to a particular surface. A plurality of attachments could be connected to the surface. A plurality of receptacles would then be operationally connected to and positioned along at least one peripheral edge of the panel. Each receptacle includes a pocket that can be aligned with a particular one of the attachments. A plurality of fasteners would mechanically connect the receptacles to the attachments.

The receptacles would be the same and/or similar to the receptacles described above. The receptacles could be integral with the panel, are adhered to the panel, mechanically connected to the panel via mechanical fasteners, connected to the panel via welds, etc.

The present invention provides a replacement convertible soft top that can be used with the O.E.M. headliner. This is economical as it is an additional, and costly, expense to replace the headliner. The present invention further provides a replacement convertible soft top that can be used with a specific type of O.E.M. headliner that attaches with anchors at different points around the perimeter of the glass window installed in the top. The present invention additionally provides a convertible top design that could be used for O.E.M. tops by automobile manufacturers that does not require a costly molding process to secure the window and provide attachment points for the headliner. This simplifies the process of replacing the convertible top and allows a convertible automobile owner to use an after-market soft-top instead of having to obtain one from the automobile dealer.

The above-described embodiments of the present invention are illustrative only and not limiting. It will thus be apparent to those skilled in the art that various changes and modifications may be made without departing from this invention in its broader aspects. Therefore, the appended claims encompass all such changes and modifications as falling within the true spirit and scope of this invention.

What is claimed is:

1. A process for replacing a first soft-top of a convertible-top of a motor vehicle with a second soft-top, comprising the steps of:
   removing the first soft-top from the convertible-top;
   separating the first soft-top from a headliner of the convertible-top;
   selecting the second soft-top having a window larger than a window of the first soft-top;
   fixing a plurality of receptacles to an edge of the larger window;
   attaching the second soft-top to the motor vehicle; and
   connecting the larger window directly to the headliner by engaging headliner anchors with the receptacles fixed to the larger window.

2. The process of claim 1, wherein the fixing step includes the step of aligning the receptacles with the headliner anchors.

3. The process of claim 2, wherein the aligning step includes the step of aligning a pocket of each receptacle with a respective one of the anchors.

4. The process of claim 1, wherein the fixing step includes the step of integrally forming the receptacles with the larger window.

5. The process of claim 1, wherein the fixing step includes the step of adhering the receptacles to the larger window.

6. The process of claim 1, wherein the selecting step includes the step of selecting the larger window and securing the larger window to the second soft-top.

7. The process of claim 1, wherein the connecting step includes the step of mechanically connecting the receptacles and anchors utilizing a plurality of fasteners.

8. The process of claim 7, wherein each fastener comprises a flexible clip for gripping and elastically retaining the anchor within a pocket of the respective receptacle.

9. The process of claim 7, wherein each fastener comprises a threaded shaft for matingly engaging a threaded pocket of the respective receptacle.

10. The process of claim 7, wherein each anchor includes a base connected to the headliner and an inverted U-shaped bar connected to the base, and each fastener includes a flexible clip for hooking a respective anchor; wherein free ends of the clip are frictionally retained within a pocket of the receptacle.

11. A process for replacing a first soft-top of a convertible-top of a motor vehicle with a second soft-top, comprising the steps of:
   removing the first soft-top from the convertible-top;
   separating the first soft-top from a headliner of the convertible-top;

selecting the second soft-top having a window larger than a window of the first soft-top;

fixing a plurality of receptacles to an edge of the larger window;

attaching the second soft-top to the motor vehicle; and connecting the larger window directly to the headliner by engaging headliner anchors with the receptacles fixed to the larger window; wherein the fixing step includes the step of aligning the receptacles with the headliner anchors, and the connecting step includes the step of mechanically connecting the receptacles and anchors utilizing a plurality of fasteners.

12. The process of claim 11, wherein the aligning step includes the step of aligning a pocket of each receptacle with a respective one of the anchors.

13. The process of claim 11, wherein the fixing step includes the step of integrally forming the receptacles with the larger window.

14. The process of claim 11, wherein the fixing step includes the step of adhering the receptacles to the larger window.

15. The process of claim 11, wherein the selecting step includes the step of selecting the larger window and securing the larger window to the second soft-top.

16. The process of claim 11, wherein each fastener comprises a flexible clip for gripping and elastically retaining the anchor within a pocket of the respective receptacle.

17. The process of claim 11, wherein each fastener comprises a threaded shaft for matingly engaging a threaded pocket of the respective receptacle.

18. The process of claim 11, wherein each anchor includes a base connected to the headliner and an inverted U-shaped bar connected to the base, and each fastener includes a flexible clip for hooking a respective anchor; wherein free ends of the clip are frictionally retained within a pocket of the receptacle.

19. A process for replacing a first soft-top of a convertible-top of a motor vehicle with a second soft-top, comprising the steps of:

removing the first soft-top from the convertible-top;

separating the first soft-top from a headliner of the convertible-top;

selecting the second soft-top having a window larger than a window of the first soft-top;

fixing a plurality of receptacles to an edge of the larger window;

attaching the second soft-top to the motor vehicle; and connecting the larger window directly to the headliner by engaging headliner anchors with the receptacles fixed to the larger window; wherein the fixing step includes the step of aligning a pocket of each receptacle with a respective one of the headliner anchors, the selecting step includes the step of selecting the larger window and securing the larger window to the second soft-top, and the connecting step includes the step of mechanically connecting the receptacles and anchors utilizing a plurality of fasteners; each fastener comprising a flexible clip for hooking, gripping and elastically retaining a respective anchor within a pocket of the respective receptacle with free ends of the clip frictionally retained within the pocket, and each anchor includes a base connected to the headliner and an inverted U-shaped bar connected to the base.

20. The process of claim 19, wherein the fixing step includes the step of integrally forming the receptacles with the larger window.

21. The process of claim 19, wherein the fixing step includes the step of adhering the receptacles to the larger window.

* * * * *